United States Patent [19]

Prudhon et al.

[11] 4,265,702
[45] May 5, 1981

[54] METHOD AND APPARATUS FOR THE TREATMENT OF HEAT-SENSITIVE MATERIALS

[75] Inventors: François Prudhon, Versailles; Augustin Scicluna, Aubervilliers, both of France

[73] Assignee: Rhone-Poulenc Industries, Paris, France

[21] Appl. No.: 19,584

[22] Filed: Mar. 12, 1979

Related U.S. Application Data

[63] Continuation of Ser. No. 921,073, Jun. 30, 1978, abandoned, which is a continuation-in-part of Ser. No. 872,151, Jan. 25, 1978, abandoned, which is a continuation-in-part of Ser. No. 770,802, Feb. 22, 1977, abandoned, which is a continuation of Ser. No. 479,774, Jun. 17, 1974, abandoned.

[30] Foreign Application Priority Data

Jul. 1, 1977 [FR] France .............................. 77 20287

[51] Int. Cl.³ .............................................. B01D 1/16
[52] U.S. Cl. ................................... 159/48 R; 99/470; 159/4 B; 261/79 A; 261/115; 261/116; 261/152; 426/471; 426/474

[58] Field of Search .................. 261/21, 76, 77, 79 A, 261/116, 118, DIG. 54, DIG. 75, 152–157, 115; 239/403, 405, 406; 159/4 B, 48 R, 48 L, 4 E; 106/109; 431/173; 55/235–238, 257 R, 80, 83, 84; 426/474, 471; 99/467, 470

[56] References Cited

U.S. PATENT DOCUMENTS

| | | | |
|---|---|---|---|
| 860,929 | 7/1907 | Merrell et al. | 159/48 R |
| 1,183,098 | 5/1916 | Merrell et al. | 159/4 B |
| 2,887,390 | 5/1959 | Coulter et al. | 159/4 B X |
| 3,039,107 | 6/1962 | Bradford | 159/4 B |
| 3,177,634 | 4/1965 | Latham, Jr. et al. | 55/238 X |
| 3,231,413 | 1/1966 | Berquin | 159/4 E |
| 3,275,063 | 9/1966 | Tailor | 261/118 X |
| 3,284,169 | 11/1966 | Tominaga et al. | 261/79 A X |
| 3,412,529 | 11/1968 | Tailor | 261/79 A X |

*Primary Examiner*—Richard L. Chiesa
*Attorney, Agent, or Firm*—Burns, Doane, Swecker & Mathis

[57] ABSTRACT

The drying and dehydration of heat-sensitive materials is improved by submitting such materials to a second thermal treatment following their initial flash treatment. The method is particularly applicable to the treatment of foodstuffs.

20 Claims, 3 Drawing Figures

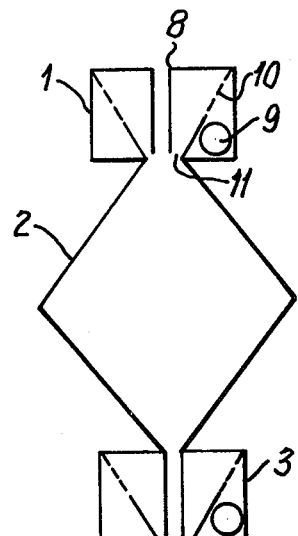
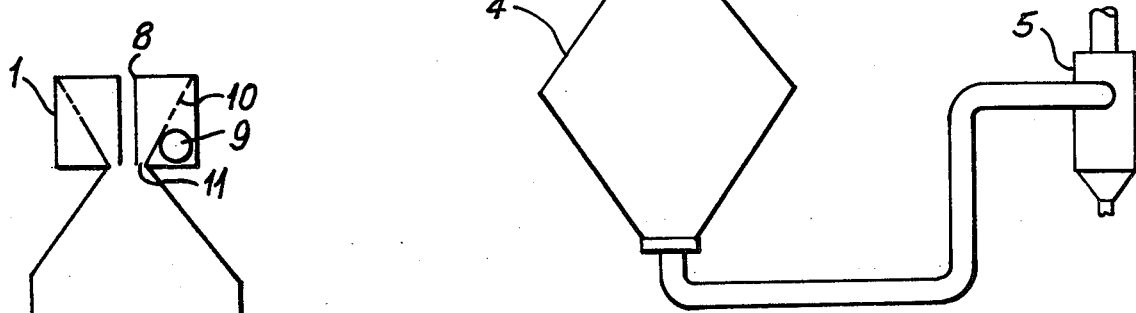
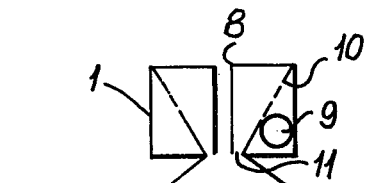
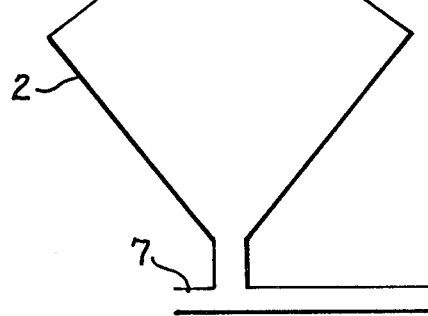

METHOD AND APPARATUS FOR THE TREATMENT OF HEAT-SENSITIVE MATERIALS

CROSS-REFERENCE TO RELATED APPLICATIONS

This is a continuation, of application Ser. No. 921,073, filed June 30, 1978 now abandoned; which in turn is a continuation-in-part of Ser. No. 872,151, filed Jan. 25, 1978 now abandoned; which in turn is a continuation-in-part of Ser. No. 770,802, filed Feb. 22, 1977 now abandoned; which in turn is a continuation of Ser. No. 479,774, filed June 17, 1974 now abandoned.

BACKGROUND OF THE INVENTION

1. Field of the Invention

The invention relates to a new process for the treatment of heat-sensitive materials, particularly foodstuffs, which involves the intimate contacting of plural, distinct physical phases and the ultimate separation of the various products resulting therefrom.

2. Description of the Prior Art:

The drying and dehydration of heat-sensitive substances, particularly food products, have been the subject of numerous studies and publications. Thus, as early as 1906, U.S. Pat. No. 860,929 proposed elimination of moisture from liquid, semi-liquid or solid materials to afford dry products, by pulverizing the mass and contacting it with a flow of cold or hot air. This process was recommended for drying juice, pulps, milk, eggs and medicines, but it had two major disadvantages. First, it was performed in an uncertain manner, from volume element to volume element, which caused the treatment time to vary from one element to another. Thus, in order to be reasonably certain that all of the material had been treated, the retention time of the phases had to be extended. This first disadvantage entailed a second one, namely the necessity of utilizing a gas for the treatment at a temperature near that of the product to be treated, in order not to run the risk of degrading the product. This resulted on the one hand in a poor distribution of the characteristics of the product obtained and, on the other, in a poor thermal yield. Nevertheless, for a long period of time the processes of contacting the treating substances with the substances to be treated rested on the principle of the uncertain distribution of contacts, in the absence of a knowledge of how to achieve organized distribution.

An ideal spray dryer which would eliminate the disadvantages indicated above would comprise a vertical, cylindrical contact zone in which the gas and the dispersed liquid droplets are uniformly, regularly distributed, with the liquid being dispersed or entrained therein in the form of substantially equally sized droplets. Ideally, all of the droplets would follow the same flow path through the apparatus as to be subjected to the same treatment and, accordingly, to continuously give rise to the formation of identical product. Stated differently, the entire volume of the physical phase to be treated, in this spray drying event the same being a dispersed liquid droplet phase, should be subjected to the same historical profile operationally in order to receive an essentially identical amount and duration of treatment by the treatment medium or phase, under the same conditions (especially those of temperature and concentration). And the immediately aforesaid of course presupposes or implies the realization or attainment of a precisely, indeed near perfectly controlled rate of flow.

In our abandoned application, Ser. No. 770,802, filed Feb. 22, 1977 (a continuation of our abandoned parent application, Ser. No. 479,774, filed June 17, 1974), it has been shown that certain conditions very close to the ideal can be attained by insuring flow or distribution of vortex type, by operating within certain well defined parameters of both geometry and kinetics. As disclosed in the noted '802 application (heavy expressly incorporated by reference in its entirety and relied upon), in an initial stage in the process the plural phases are manipulated upstream of their convergence by supplying same to a cylindrical distribution zone, at least one of the phases being introduced via a helical trajectory inducing inlet and being axially extended, while maintained in an axially symmetrical, helical flow path, through said distribution zone. By "axially symmetrical, helical flow path", there is denoted a regularly repeating, helical path of axially extending downward flow which is essentially symmetrical with respect to at least one plane containing the axis of such helical flow. At least one other phase is also introduced to the distribution zone, via a suitable inlet and it too is axially extended therethrough, but in this instance the path of downward flow is essentially rectilinear. The longitudinal axis of the path of rectilinear flow is, moreover, coaxial with the longitudinal axis of the path of helical flow. The current of circulating helical flow next progresses to a confining zone of restricted flow passage so constructed that the minimum momentum of the helical flow is at least 100 times greater than the momentum of the coaxial rectilinear flow, and such that the plural flow paths or separately supplied phases converge and are combined, blended and admixed in yet a third distinct zone, the contact zone. Thus, the trajectory imparted by the helical flow, at its point of exit from the zone of restricted flow passage, forms one of the classes of generatrices of a hyperboloid to a thin surface, or, more correctly, a layered stack of a plurality of hyperboloids. Said generatrices are conveyed through a series of circles to form a ring of narrow width which is situated downstream of the restricted passage for the helical flow, but upstream of its divergence. This ring surrounds a zone of depression, the effects of which are manifested both upstream, on the phase constituting rectilinear flow, as well as downstream, on the phase constituting circulating helical flow, by effecting the recycling of a portion of such fluids. In this fashion, in the zone downstream from the area of combining or convergence of the separately supplied fluids or plural flow paths, and in the same plane which is perpendicular to their coaxis, all vectors of the individual elements constituting total volume are equal in absolute value, are divergent and are mutually subtracted upon rotation about the coaxis; hence, at two successive intervals, two distinct units of volume in the same trajectory evidence the same historical processing profile, thus assuring maintenance of contact between the two phases. Accordingly, if the rectilinear flow, for example, be constituted of a liquid phase and the helical flow of a gaseous phase, the liquid phase will be disintegrated, fractionated or atomized into a multitude of droplets, with each droplet being dispersed in a given volume of the gas and subjected to a certain movement or velocity thereby, by being physically swept along with said gas, thus creating the effect of centrifugation; this phenomenon enhances contact with the vector gas and, in those cases where combustion results, insures ignition and flame stability. Such a process, therefore, in a notably marked advance in the art of rapid intimate contact between two disparate phases. Nonetheless, a product separation problem arises, for example, the elimination of gases from any solid or liquid phase recovered. In Ser. No. 770,802, this function of separation is assured by means of a cyclone.

Thus, in Ser. No. 770,802, the same means perform the uniform formation of the dispersion and its equally uniform treatment from volume element to volume element. In a simple manner, it may therefore be said that the system acts as a piston and as a flash reactor at the same time. Because of this dual character, it is possible to treat uniformly and in a very short period of time, heat-sensitive materials with gases at a temperature higher than could ordinarily be endured by said materials, since the true temperature to be taken into consideration is that, not of the gaseous phase performing the treatment, but that actually attained by the substance being treated.

The process of Ser. No. 770,802 has yielded excellent results. However, it is clear that the time of treatment, reduced to the distance through the piston zone of flow, is very short. In this part of the apparatus, the release of moisture is thus very great and the resulting downstream environment has a moisture content which, in the vicinity of the walls, is difficult to control. This difficulty is enhanced by the fact that the substances are not immediately separated and collected, the separation being generally effected by a cyclone following and downstream of the vessel in which contact takes place. To reduce this problem (as well as to avoid disadvantages inherent in the use of a cyclone to achieve separation), our abandoned application, Ser. No. 872,151, filed Jan. 25, 1978 provides a cylindrical wall member integrally secured to the trajectories or outlet of the contact zone of any device disclosed in our abandoned application, Ser. No. 770,802, effecting an abrupt change or variation in the velocity field of at least one of the phases, while at the same time maintaining the general direction of flow of said phases. More particularly, according to the invention of Ser. No. 872,151, there are provided both apparatus and process for the formation of an intimate, homogeneous product mix comprising at least two disparate physical phases, and for the ultimate facile separation and recovery of the various products resulting from such mixing. According to the '151 invention an intimate, homogeneous admixture of said phases is assured by mutually contacting the same by means of a flow of vortex type. This is accomplished by supplying at least one of the phases to a first cylindrical distribution zone via a helical trajectory inducing inlet, and whereby the same is axially extended through such zone while being maintained in an axially symmetrical, helical flow path. By "axially symmetrical, helical flow path", here too is intended a regularly repeating, helical path of axially extending downward flow which is essentially symmetrical with respect to at least one plane containing the axis of the helical flow. At least one other phase is also introduced to this first distribution zone, via a suitable inlet, and it too is axially extended therethrough, but in this instance the path of downward flow is essentially rectilinear. The longitudinal axis of the path of rectilinear flow is, moreover, coaxial with the longitudinal axis of the path of helical flow. The current of circulating helical flow next progresses to a confining zone of restricted flow passage so constructed that the minimum momentum of the helical flow is at least 100 times greater than the momentum of the coaxial rectilinear flow, and such that the plural flow paths or separately supplied phases converge and are combined, blended and admixed in yet a third distinct zone, the contact zone. In the contact zone, the trajectories common to the different phases are directed against a cylindrical surface, the intimate admixture remaining in contact with said surface as a result of the effects of that centrifugal force imparted to the system by means of the circulating, helical flow. Phase separation is next effected by an abrupt change in the field of velocities of at least one of the disparate phases, while at the same time maintaining the general direction of flow of the several phases. Ultimately, the products resulting from the intimate admixture or contacting of the various phases are recovered separately. The plural phases subjected to treatment according to the '151 invention may be either gaseous, liquid or solid phases. Typically, the kinetics of the procedure according to the '151 invention are tantamount to those described in our aforesaid application, Ser. No. 770,802, namely, the minimum momentum of the helical flow is at least 100 times greater than the momentum of the coaxial rectilinear flow.

The abrupt change or variation in the field of velocities of at least one of the disparate phases is conveniently and practically achieved by mere abrupt change in the direction of the helical flow. The abrupt change in direction may also be effected by substantial variation in the cross section of the downstream zone of cylindrical flow. Also, if a particular treatment be carried out according to the '151 invention, such as, for example, a concentration, yet another treatment or processing parameter may be added thereto or combined therewith, e.g., an additional thermal or chemical treatment; any thermal treatment may be effected by a given phase, per se.

The apparatus according to the '151 invention may easily be fabricated, simply by adding or securing to the contactor disclosed in the noted '802 application, (1) a vertical, cylindrical wall member integral therewith and axially downstream therefrom and in communicating relationship therewith, and defining a phase separation zone, (2) a base member, said base member having a cross section which is greater in diameter than the diameter of the cylinder (1) defining the phase separation zone, and also being integral and in communicating relationship therewith, said base member comprising (3) an outlet or evacuating conduit for the lightest of the plural phases, with the upstream or inlet end of such conduit or duct being disposed essentially planar with, or at the height of the point of integral junction between the cylindrical wall member (1) and the base member (2). The angle of juncture between the cylindrical wall member and the base member having the greater diameter cross section may vary over considerably wide limits.

In another embodiment of the '151 invention, apparatus otherwise identical to that immediately above-described may be utilized, except that the base member may itself have a cross section which is identical to that of the vertical, cylindrical wall member. The base member may be, for example, itself cylindrical, in which case it can be directly, integrally attached to the cylindrical wall member by means of any suitable sleeve, but the same may also be of slightly greater or lesser cross section and thus directly integrally attached to the cylindrical wall member, for example, by force-fit, suitable gasket and nuts and bolts, or other securing means.

The contactor of the '151 invention too may be comprised of a variety of other elements, such as one or more hoppers and various conduits defining both inlets and outlets for the introduction and removal of the various plural phases. For the sake of simplicity and brevity, that device according to the abandoned application, Ser. No. 770,802, shall hereinafter be referred to as the "head" of the subject contactor. Such a head conveniently comprises an at least partially cylindrical casing or tubular wall member terminating at its downside end either (i) in a truncated cone, the smaller base of which defining the downstream outlet of the distribution zone (as well as defining the confining zone of restricted flow passage), or (ii) terminating in a centrally apertured flat disc or plate, said central aperture being both circular and coaxial with the casing or tubular wall member. The circular aperture, in this embodiment, also defines the confining zone of restricted flow passage. The upstream end of the casing or tubular wall member is sealed, but has extending therethrough and deep within the casing an internal conduct or pipe member which is coaxial with the tubular casing, and which terminates in an outlet aperture which is spaced from the mean plane of the circular aperture defining the confining zone of restricted flow passage by a length or distance which is between 0 and the radius of said zone of restricted flow passage. The head also comprises a helical trajectory inducing inlet for one of the phases, and means for axially extending the flow from such inlet completely through that interspace thus established between the inner walls of the tubular casing and the outer walls of the coaxial, internal tubular conduit, while at the same time being maintained in an axially symmetrical, helical flow path.

The coaxial, internal tubular conduit or pipe may inself envelop yet one or more additional coaxial, concentric tubular conduits, for example, where necessary to rectilinearly charge several fluids which should be kept out of mutual contact or admixture with each other prior to their contact or admixing with the helical flow current.

It is, nonetheless, highly essential that the helical flow be maintained, axially symmetrical, i.e., a regularly repeating, helical path of axially extending downward flow which is essentially symmetrical with respect to at least one plane passing through the axis of the helical flow. In the case of a contactor having relatively small dimensions, this object is conveniently attained by utilizing more than one helical trajectory inducing inlet, but, advantageously, the wall member defining the first distribution zone simply comprises a perforated, at least partially cylindrical or frusto-conical element fitted within an outside enveloping continuous jacket adapted to, and receiving a tangential, helical trajectory inducing inlet. The apertures or orifices comprising such an element are necessarily "thin-walled orifices". It too is important that the distribution of such orifices or apertures be regular and that the surface area of the orifices be such that the perforate wall, in the majority of cases, does not induce a pressure drop of greater than about 50 g/cm$^2$ in the fluid flow; a flow rate of 35 m$^3$/h through an aperture 20 mm in diameter, for example, is easily obtainable. Cf. our abandoned application, Ser. No. 770,802.

In a particularly advantageous embodiment according to the '151 invention, the diameter of the outlet or evacuating conduit comprising the base member is at least two thirds of the diameter of the cylindrical wall member defining the phase separation zone.

Thus, Ser. No. 872,151 (hereby expressly incorporated by reference and relied upon) provides excellent phase separation. However, this solution is not always satisfactory in itself because the nature of the environment and its physical conditions are not changed and the problem of excess moisture remains.

SUMMARY OF THE INVENTION

It has now been discovered, and this represents the object of the present invention, that the disadvantage of excess moisture can be alleviated by exposing the product of the flash treatment to the action of a second thermal treatment zone. More particularly, it has been found that, in the case of heat-sensitive materials, this second zone, advantageously, should be a cooling zone offering a considerable temperature gradient with respect to the first zone.

BRIEF DESCRIPTION OF THE DRAWINGS

FIG. 1 is an axial, diagrammatical cross-sectional view of one embodiment of a phase contactor according to the invention;

FIG. 2 is an axial, diagrammatical cross-sectional view of another embodiment of a phase contactor according to the invention; and FIG. 3 is an axial, diagrammatical cross-sectional view of yet another embodiment of a phase contactor according to the invention.

DETAILED DESCRIPTION OF THE INVENTION

More particularly according to the invention, there are provided both apparatus and method for the treatment of heat-sensitive materials comprising the formation of an intimate homogeneous product mix of at least two disparate physical phases, and the ultimate facile separation and recovery of the various products resulting from such mixing, wherein the medium resulting from the mixing is subjected to at least a second thermal treatment. The second thermal treatment zone is advantageously a cooling zone offering a considerable temperature gradient with respect to the first zone. This avoids condensation in the downstream zone. Further, this tempering effect intervening immediately after the first flash heat treatment makes it possible to subject the product, without degradation, to heating to a temperature substantially higher than its customary limit of heat sensitivity. In addition, surprisingly, novel secondary effects, such as changes in volume mass, porosity, superficial appearance, etc. have been observed.

The second thermal treatment may take place before or after the separation. In practice, in the case of food-type products, such as egg yolks, milk, etc., the first treatment is conveniently performed by introducing the gases at a temperature of 200° to 700° C. and by treating the product at the outlet of the reaction vessel at a temperature of 20° to 120° C., the substance being separated subsequently, for example by a cyclone. This second treatment may be effected by a device identical with that of the first heat treatment. A mode of separation according to Ser. No. 872,151, cited above, may also be used. In this case, the second thermal treatment may be performed on the product, whether it has been separated from the hot gas or not.

As mentioned hereinabove, the process of the present invention may be applied to food supplies, for example to the treatment of natural protein products or their extracts. In particular, the process may be employed in the treatment of vegetable substances such as straw, alfalfa, rape, soy beans, kidney beans, green peas, seaweed and other vegetables. The process of the present invention may also be applied to the case of several successive thermal treatments.

Referring specifically to the Figures of Drawing, in FIGS. 1, 2 and 3 are illustrated, in axial, diagrammatical cross sections, three different embodiments of an apparatus according to the invention. FIG. 1 illustrates an assembly comprising a treating head 1 according to Ser. No. 770,802, a dual cone 2 serving as a receptable in which the treatment takes place, another head 3 also conforming to Ser. No. 770,802, a second dual cone 4 and a cyclone 5 in which the final separation takes place. FIG. 2 represents another form of embodiment where is indicated very schematically a head 1 being identical with that of FIG. 1. But, in keeping with the treaching of Ser. No. 872,151, the head is extended not by a dual cone but by cylindrical shaft 6 in which the phases are separated. A treating gas is subsequently introduced through the tube 7, while the treated substance is recovered by a cyclone 5. FIG. 3 represents a mode of embodiment which comprises a first thermal treatment zone identical with that of FIG. 1 and a second zone identical with that of FIG. 2.

In more detail, according to FIG. 1, the substance to be treated is introduced in the form of a paste or a pulp through an axial conduit 8 of the head 1; at the outlet of said conduit the substance is entrained by the swirling turbulent flow generated by a gaseous phase introduced through a tangential conduit (9) and shaped by a perforated jacket 10 located inside the head 1, and a restraint 11. The treatment takes place at the outlet of the head 1, in the upper part of the dual cone 2. The medium is then entrained by a second turbulent flow generated by a second head 3, similar to the head 1. After leaving the dual cone 4, the phases are then separated in the cyclone 5.

According to FIG. 2, the initial treatment is identical to that described above, but the second treatment takes place after the separation of the phases and affects only the solid phase; it is accomplished by the action of a turbulent mixture along the tube 7.

According to another variant, not shown, the separation of the hot phases may be effected by means of a cyclone.

In keeping with still another variant, not shown, the head 3 of FIG. 1 may be replaced by a device according to U.S. Ser. No. 770,053, filed Feb. 18, 1977 (a continuation of U.S. Ser. No. 590,812, filed June 27, 1975). Such a device comprises an external cylindrical or frustoconical casing defining a chamber which is closed at one end by an upstream wall and at least partially open at or near its downstream end; a perforated internal envelope coaxial with and inside the external casing, defining with the latter an annular space; an axial injection means for the introduction of one phase; and means for the tangential introduction of another phase into said annular space.

FIG. 3 represents the device employed in the examples which follow. The head 1 has an internal diameter of 300 mm and a height of 250 mm, and the restraint 11 has a diameter of 45 mm, which corresponds to the diameter of the smallest section of the perforated jacket 10. The downstream diameter of passage for the liquid of the rectilinear phase is equal to 8 mm. The dual cone 2, which serves as the receptacle, has a diameter of the largest section of 1 m, an upper angle of 90° and a lower angle of 60°. The compressed air inlet pipe system 7 has a diameter of 100 mm.

In the following examples, which are given by way of illustration only, egg whites, vanilla, sunflowers, alfalfa, and concentrated milk were treated successively under the conditions indicated in the table.

| Example | Nature of product | Air flow in the head 1, Nm³/h | Compressed cooling air, (25°)Nm³/h | Air pressure Torr | Temperature inlet | outlet | cyclone |
|---|---|---|---|---|---|---|---|
| 1 | Egg white | 220 | 150 | 1.3 | 240 | 100 | 75 |
| 2 | " | " | " | " | 550 | " | " |
| 3 | " | " | " | " | 700 | " | " |
| 4 | Vanilla | " | " | " | 500 | 120 | 80 |
| 5 | Sunflowers | " | " | " | 615 | 108 | 80 |
| 6 | Alfalfa | " | " | " | 400 | 100 | 80 |
| 7 | Conc. milk | " | " | " | 400 | 105 | 80 |

For the first three examples, foaming tests were performed in accordance with the prescriptions of the INSTITUUT VOOR PLUIMVEEONDERZOEK "HET SPELDERHOLT" Report No. 2872, to determine the relative volume of the foam, the foam stability and the time required for the maximum foam volume. The relative foam volume was determined by introducing 75 ml of eggs into a beater (The same Hobart N50 beater was used in all of the examples.) and measuring the maximum volume of foam formed in the test tube. The foam volume is given by the formula:

(foam volume/75 ml) × 100%

For a control powder, not conforming to the invention, this test yielded a result between 800 and 900. But with the invention, a value of 1175 was obtained, which is a considerable improvement.

The stability of the foam was then determined by measuring, after 1 hour, the weight of the product which had settled out at the bottom of the test tube.

stability = (initial weight − weight of the product settled out)/initial weight

The value found was 75%, in place of 65%, which confirms the preceding result.

Finally, the time required to obtain the maximum foam volume was determined. The value found was 7 min, which is normal.

The results indicated above show that the quality of the product obtained does not decline despite the elevation of the inlet temperature. This is in contrast to the teachings of the prior art which indicated that, in a dryer of the classical type, the inlet temperature represented a true limit because critical outlet temperatures are attained more rapidly than those of the inlet; being given the fact that the nature of the products to be treated imposed a low temperature, there necessarily resulted poor thermal yields.

Examples 4, 5 and 6 on other substances confirm the possibility of using an elevated inlet temperature and thus a novel effect of the present invention.

Finally, Example 7 shows another cumulative effect of the present invention, which is to permit the treatment of concentrated solutions.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A process for the treatment of heat-sensitive materials by the intimate contacting of plural, physically disparate phases, comprising (1) (i) a first thermal flash treatment including establishing a vertically descending current of axially extending, axially symmetrical helical flow of a first gaseous phase, (ii) separately establishing a current of coaxially downwardly vertically extending, rectilinear continuous jet stream of a physically disparate second liquid paste or pulp phase, (iii) maintaining said currents of said first and said second phases physically separate from each other, (iv) circulating and directing said currents which comprise the plural phases to a zone of restricted flow passage with respect to said helical flow, (v) at said zone of restricted flow passage, converging and intimately, homogeneously admixing said plural currents, and disintegrating into a multitude of substantially equally sized droplets and entraining said rectilinear jet stream within said helical current of gaseous flow, and maintaining at such zone of convergence a momentum of the first phase helical flow of at least 100 times greater than the momentum of the second phase, coaxial rectilinear jet stream, (vi) concurrently establishing a flow defining a layered horizontal stack of a plurality of hyperboloids by means of the trajectory of said helical current of gaseous flow, which, at a point downstream from said zone of restricted flow passage coestablishes a zone of narrower width than said zone of restricted flow passage, and whereby each entrained droplet is subjected to essentially the same historical processing profile; (2) subjecting the product of said first thermal treatment, in a distinct zone downstream therefrom, to a second thermal treatment including exposing same to a temperature less than that of said first thermal treatment, whereby liquid condensation is avoided in said downstream zone; and (3) phase separating the liquid/gaseous product admixture.

2. The process as defined by claim 1, wherein the second thermal treatment takes place prior to the phase separation treatment.

3. The process as defined by claim 1, wherein the second thermal treatment takes place after the phase separation treatment.

4. The process as defined by claim 1, wherein food supplies are treated at a temperature of 200° to 700° C. during the first thermal treatment and at a temperature of 20° to 120° C. during the second thermal treatment.

5. The process as defined by claim 4, wherein the food supplies are selected from the group consisting of egg whites, vanilla, sunflowers, alfalfa and concentrated milk.

6. The process as defined by claim 1, wherein said phase separation treatment comprises abruptly changing the velocity field of at least one of said plural phases, while at the same time maintaining the general direction of flow of said admixed plural phases.

7. The process as defined by claim 6, wherein said phase separation treatment takes place prior to the second thermal treatment.

8. A process for the treatment of heat-sensitive materials by the intimate contacting of plural, physically disparate phases, consisting essentially of (1) (i) a first thermal flash treatment including establishing a vertically descending current of axially extending, axially symmetrical helical flow of a first gaseous phase, (ii) separately establishing a current of coaxially downwardly vertically extending, rectilinear continuous jet stream of a physically disparate second liquid paste or pulp phase, (iii) maintaining said currents of said first and said second phases physically separate from each other, (iv) circulating and directing said currents which comprise the plural phases to a zone of restricted flow passage with respect to said helical flow, (v) at said zone of restricted flow passage, converging and intimately, homogeneously admixing said plural currents, and disintegrating into a multitude of substantially equally sized droplets and entraining said rectilinear jet stream within said helical current of gaseous flow, and maintaining at such zone of convergence a momentum of the first phase helical flow of at least 100 times greater than the momentum of the second phase, coaxial rectilinear jet stream, (vi) concurrently establishing a flow defining a layered horizontal stack of a plurality of hyperboloids by means of the trajectory of said helical current of gaseous flow, which, at a point downstream from said zone of restricted flow passage coestablishes a zone of narrower width than said zone of restricted flow passage, and whereby each entrained droplet is subjected to essentially the same historical processing profile; (2) subjecting the product of said first thermal treatment, in a distinct zone downstream therefrom, to a second thermal treatment including exposing same to a temperature less than that of said first thermal treatment, whereby liquid condensation is avoided in said downstream zone; and (3) phase separating the liquid/gaseous product admixture.

9. A phase contactor for the treatment of heat-sensitive materials by the intimate contacting of plural, physically disparate phases, which comprises (1) (i) a first thermal flash treatment zone including a distribution zone, said distribution zone being comprised of means for establishing a vertically descending current of axially extending, axially symmetrical helical flow of a first gaseous phase, means for separately establishing a current of coaxially downwardly vertically extending, rectilinear continuous jet stream of a physically disparate second liquid paste or pulp phase, and means for insuring physical separation from each other of said currents of said first and second phases, (ii) a contact zone, said contact zone being comprised of a zone of restricted flow passage with respect to the means for establishing the helical flow, means for the convergence and intimate homogeneous admixture of the separately supplied disparate phases, means for imparting a momentum to the gaseous first phase helical flow which is at least 100 times greater than the momentum of the second liquid phase, coaxial rectilinear jet stream, means for disintegrating into a multitude of substantially equally sized droplets and entraining said rectilinear jet stream within said helical current of gaseous flow, means for concurrently establishing a flow defining a layered horizontal stack of a plurality of hyperboloids via the trajectory of said helical current of gaseous flow, means for establishing, at a point downstream from said zone of restricted flow passage, a flow zone of narrower width than said zone of restricted flow passage, and whereby means are co-established as to subject each entrained droplet to essentially the same historical processing profile; (2) a second distinct thermal treatment zone, at a point downstream from said first thermal treatment zone, including means for subjecting the product of first thermal treatment to a temperature less than that of said first thermal treatment while avoiding liquid condensation in said second thermal treatment zone; and (3) a phase separation zone, including means for separating liquid/gaseous product admixture.

10. The phase contactor as defined by claim 9, wherein the second thermal treatment zone comprises (a) a distribution zone and (b) a contact zone as defined in claim 9.

11. The phase contactor as defined by claim 9, wherein the phase separation zone comprises a cyclone.

12. The phase contactor as defined by claim 9, wherein the second thermal treatment zone comprises a contact zone, said contact zone being comprised of means for the combining and admixing of the separately supplied disparate phases.

13. The phase contactor as defined by claim 12, wherein the second thermal treatment contact zone comprises a compressed air inlet pipe system, downstream from and in communicating relationship with the first thermal treatment contact zone.

14. The phase contactor as defined by claim 13, wherein the phase separation zone comprises a cyclone.

15. The phase contactor as defined by claim 9, wherein the first thermal treatment zone further comprises (c) a phase separation zone.

16. The phase contactor as defined by claim 15, wherein the first thermal treatment phase separation zone comprises means for abruptly changing the velocity field of at least one of said plural phases, means for maintaining the general direction of flow of said admixed plural phases, and means for effecting phase separation of the product of admixture of said plural phases.

17. The phase contactor as defined by claim 16, wherein the second thermal treatment zone comprises a contact zone, said contact zone being comprised of means for the combining and admixture of the separately supplied disparate phases.

18. The phase contactor as defined by claim 17, wherein the second thermal treatment contact zone comprises a compressed air inlet pipe system downstream from and in communicating relationship with the first thermal treatment contact zone.

19. The phase contactor as defined by claim 18, wherein the phase separation zone following the second thermal treatment zone comprises a cyclone.

20. A phase contactor for the treatment of heat-sensitive materials by the intimate contacting of plural, physically disparate phases, consisting essentially of (1) (i) a first thermal flash treatment zone including a distribution zone, said distribution zone being comprised of means for establishing a vertically descending current of axially extending, axially symmetrical helical flow of a first gaseous phase, means for separately establishing a current of coaxially downwardly vertically extending, rectilinear continuous jet stream of a physically disparate second liquid paste or pulp phase, and means for insuring physical separation from each other of said currents of said first and second phases, (ii) a contact zone, said contact zone being comprised of a zone of restricted flow passage with respect to the means for establishing the helical flow, means for the convergence and intimate homogeneous admixture of the separately supplied disparate phases, means for imparting a momentum to the gaseous first phase helical flow which is at least 100 times greater than the momentum of the second liquid phase, coaxial rectilinear jet stream, means for disintegrating into a multitude of substantially equally sized droplets and entraining said rectilinear jet stream within said helical current of gaseous flow, means for concurrently establishing a flow defining a layered horizontal stack of a plurality of hyperboloids via the trajectory of said helical current of gaseous flow, means for establishing, at a point downstream from said zone of restricted flow passage, a flow zone of narrower width than said zone of restricted flow passage, and whereby means are co-established as to subject each entrained droplet to essentially the same historical processing profile; (2) a second distinct thermal treatment zone, at a point downstream from said first thermal treatment zone, including means for subjecting the product of first thermal treatment to a temperature less than that of said first thermal treatment while avoiding liquid condensation in said second thermal treatment zone; and (3) a phase separation zone, including means for separating liquid/gaseous product admixture.

* * * * *